Feb. 18, 1969

W. W. JACOBS 3,427,746

VEHICLE WITH BRIDGING STRUCTURE

Filed Sept. 13, 1965

Winston W. Jacobs
INVENTOR

BY Kolisch & Hartwell
Attys.

United States Patent Office 3,427,746
Patented Feb. 18, 1969

3,427,746
VEHICLE WITH BRIDGING STRUCTURE
Winston W. Jacobs, Portland, Oreg., assignor to New Rochelle Manufacturing Company, New Rochelle, N.Y., a corporation of New York
Filed Sept. 13, 1965, Ser. No. 486,610
U.S. Cl. 46—206                              7 Claims
Int. Cl. A63h *17/00, 17/04;* B62d *55/00*

ABSTRACT OF THE DISCLOSURE

Vehicle with bridging structure comprising an elongated member which is extensible from one end of the vehicle and has an arcuate transverse cross section when extended imparting rigidity to the member such cross section is flattenable with the support then having sufficient flexibility to enable coiling of the same. The support is stored in the vehicle as coils on a drum.

---

This invention relates to vehicles generally, and more specifically to a vehicle including bridging apparatus making the vehicle maneuverable in rough terrain.

Generally, an object of the invention is to provide novel bridging means in a vehicle for supporting the vehicle in its travel over depressions, wherein the bridging apparatus is operatively connected to and mounted on the vehicle.

A more specific object of the invention is to provide a ground-traveling vehicle with novel bridging apparatus mounted thereon, wherein said bridging apparatus comprises extensible support members which may be projected outwardly from one end of the vehicle to form a support platform over which the vehicle may travel in crossing a depression.

A related object is to provide such a vehicle which further includes power-operated means for extending and retracting the support members, power-operated means on the underside of the vehicle adapted to propel the vehicle over the extended support members, and means receiving the support members when retracted.

The vehicle has a construction suitable for incorporation in a remote-controlled toy, capable of conventional forward and reverse travel over the support members of its bridging apparatus when these support members are extended across a gap.

A further object is to provide a novel vehicle-mounted support member in bridging apparatus, which because of an arcuate transverse cross section has rigidity when extended, such cross section being flattenable and the support member becoming flexible when its cross section is so flattened.

Yet a further object is to provide a bridging apparatus which is relatively lightweight and compact, thereby facilitating vehicle mounting with minimum sacrifice of useable space.

These and other objects and advantages are attained by the invention, and reference is now made to the accompanying drawings which illustrate an embodiment of the invention, wherein.

Figure 1:
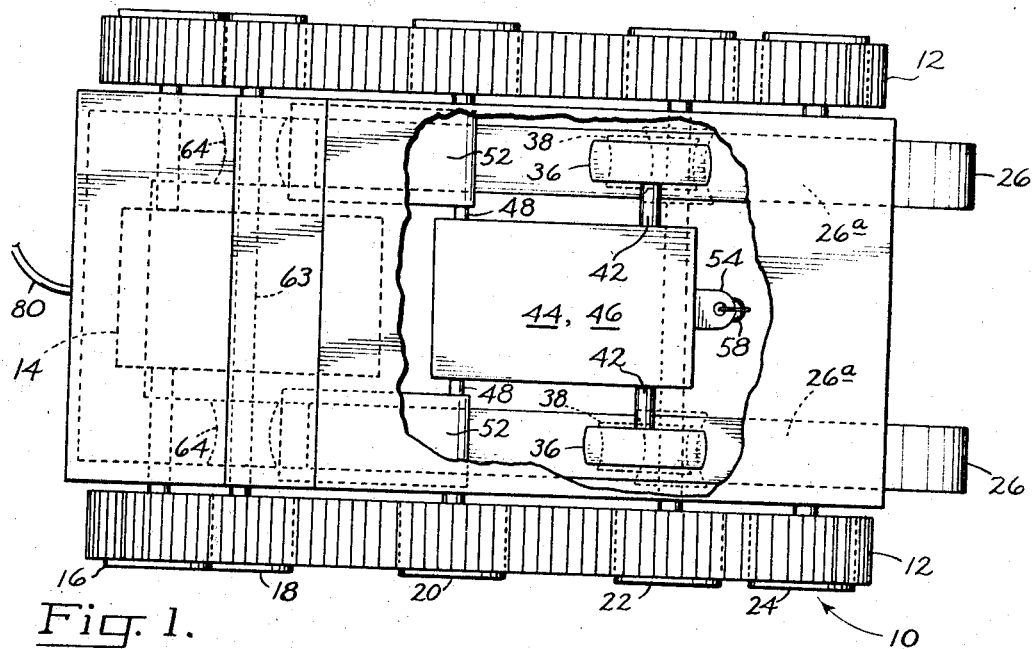
FIG. 1 is a top view of a vehicle as contemplated, including extensible bridging apparatus, with portions of the vehicle broken away.
Figure 2:
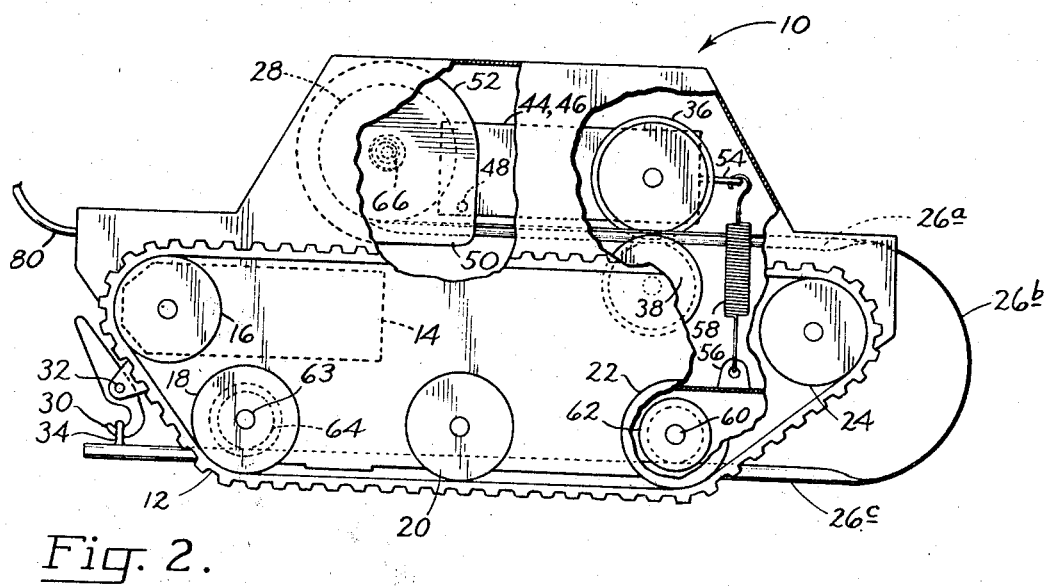
FIG. 2 is a side elevation of the vehicle and its bridging apparatus.
Figure 3:
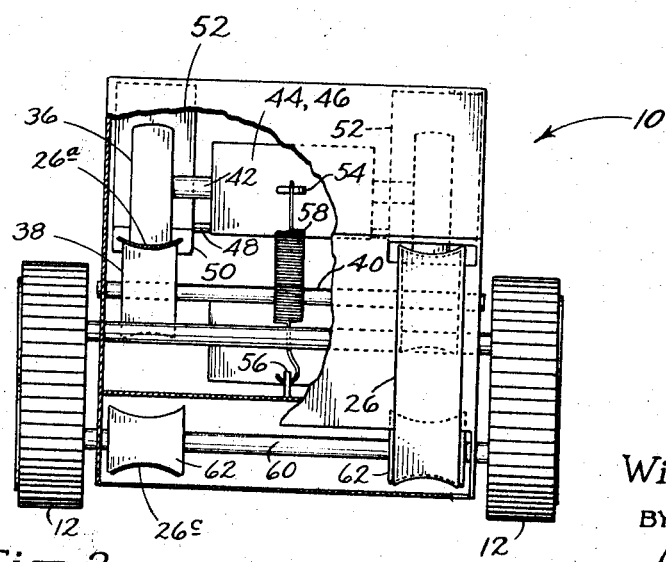
FIG. 3 is an end view of the vehicle.

Referring now to the drawings and first of all more particularly to FIGS. 1, 2 and 3, at 10 is indicated generally a vehicle frame supported above and propelled over the ground by a pair of endless tracks 12 which are laterally spaced and on opposite sides of the vehicle. These tracks are driven by a reversible motor 14 mounted on the vehicle frame and connected in the usual manner to drive members 16 which may be gears or rollers. With rotation of rollers 16 in either of opposite directions by operation of motor 14, the tracks are moved in an endless course around rotatable idler rollers 18, 20, 22, 24.

Mounted on vehicle 10 inboard of laterally spaced tracks 12 is bridging apparatus for the vehicle comprising a pair of elongated support members 26. In the embodiment of the invention illustrated in the drawings, one end of each support member is wrapped around a drum, such as the one shown at 28, mounted on an upper portion of the vehicle frame. From this drum each support member extends forwardly in a horizontal reach 26a which projects outwardly from the forward part of the vehicle. Each support member then continues in a reverse bend 26b and a horizontal reach 26c which extends rearwardly along the underside of the vehicle to terminate adjacent an anchoring hook 30. Horizontal reach 26c is at an elevation somewhat above the tracks 12 where they extend under rollers 18, 20 and 22 and thus, these horizontal reaches of the support members are out of ground contact with the track supporting the vehicle on the ground.

Anchoring hook 30 for each support member is pivotally mounted on the vehicle at 32. The hook detachably connects one end of the support member to the vehicle by the base of the hook passing through an eye 34 joined to the top of the support member. When the hook is pivoted in a counterclockwise direction in FIG. 2 and with raising of the end of support member, it may be detached from the hook thus to enable the support member to drop into ground contact.

Horizontal reach 26a of each support member passes between the nip defined by a pair of rollers 36, 38. Rollers 38 for the two support members are mounted on a rotatable shaft 40 suitably supported in the vehicle frame, and these function as back-up rollers supporting the undersides of the support members. Rollers 36 are secured to an output shaft 42 of a motor 44 (this motor also being reversible). Motor 44 is contained within a housing 46, and this housing is pivoted at 48 to ear portions 50 of housings 52 containing drums 28. Extending between a forward portion 54 of motor housing 46 and a lug 56 which is joined to the vehicle frame is a coil spring 58 serving to bias downwardly the motor housing together with the motor and rollers 36 joined to the motor output shaft. In this way frictional contact is established between rollers 36 and the tops of the support members, with the bases of the support members supported on rollers 38.

A roller 22 has been discussed in connection with each track 12 for guiding the track in its course on one side of the vehicle. Rollers 22 for the two tracks are secured to a common shaft 60 extending between the rollers, which shaft is suitably journaled in the vehicle frame. Shaft 60 mounts inboard of the two endless tracks a pair of rollers 62, one of which is disposed above reach 26c of each support member adjacent the forward end of the vehicle. Similarly, rollers 18 for the two tracks 12 are mounted on a common shaft 63, and this shaft has secured thereto rollers such as roller 64, with one of such rollers above reach 26c of each support member adjacent the rear of the vehicle. Rollers 62, 64 are utilized in moving the vehicle over the support members when they are extended and the tracks are out of ground contact, as will be later more fully described.

Drums 28 have been discussed in connection with support members 26 which have extremities of the support members wrapped thereabout. Referring to FIG. 2, each drum is spring biased by a spring 66 for rotation in a clockwise direction in FIG. 2. On an expanse of a support member being moved by rollers 36 and 38 toward a drum, spring 66 for the drum causes the drum to rotate to produce winding of the support member about the drum. The drums thus constitute stowage means in the construction for storing expanses of the support members when such is not being used for bridging purposes.

Each support member may be made of flexible spring steel, and in a vehicle intended as a toy, may take the form of the usual spring steel strip found in a coiled measuring tape. When extending in a straight course, the support member has an arcuate transverse cross section, as best illustrated in FIG. 3, and with such cross section has some rigidity and resistance to bending moments applied thereto. To accommodate this arcuate cross section, rollers 38, 62 and 64 have shallow grooves about their outer perimeters, and roller 36 has a shallow crown. Where each support member extends in a curved course, as in reverse bend 26b shown in FIG. 2, and where the support member extends around a drum, the arcuate transverse cross section is flattened out and the support member has flexibility.

Figure 4:
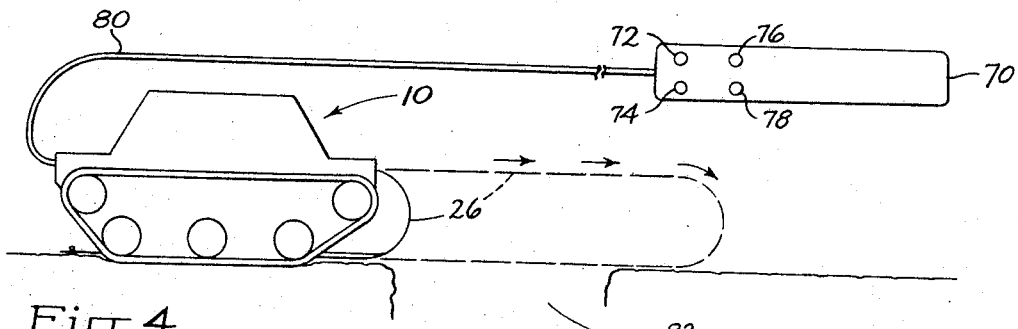
FIGS. 4, 5 and 6 are simplified side elevations of the vehicle showing how its bridging apparatus may be used to enable the vehicle to cross a depression.

Referring to FIG. 4, when the vehicle is constructed in the form of a toy, a remote control unit such as that shown at 70 may be included for controlling reversible motors 14 and 44. Such unit includes buttons 72, 74 for producing forward and reverse operation, respectively, of motor 14, and button 76, 78 for producing forward and reverse operation, respectively, of motor 44. The motors on the vehicle in the case of a toy may be battery-powered electric motor units, and the control described for the motors results from suitable switches (not shown) in the control unit actuated by the buttons described and connected to the electric circuitry of the motors by conductors contained in control cable 80.

Describing now in general terms how the vehicle may be operated to produce forward and reverse travel of the vehicle over the ground utilizing tracks 12, only motor 14 is utilized. Thus, assuming button 72 is a control button producing forward operation, when this button is depressed, the motor is operated in a direction causing clockwise rotation of rollers 16 and forward travel of the vehicle, and assuming button 74 produces reverse operation, when this button is depressed reverse operation of motor 14 occurs with rollers 16 in the tracks moving in the opposite direction.

Figure 5:
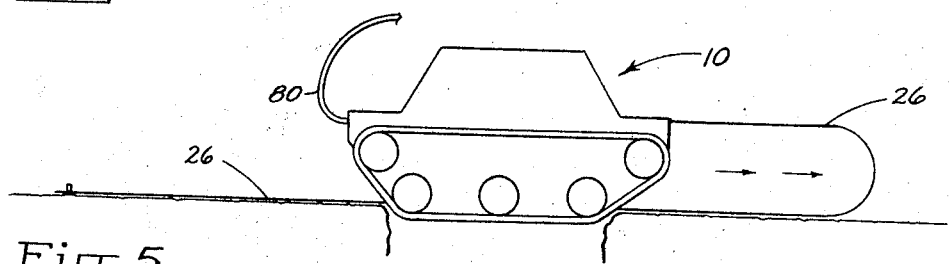
Figure 6:
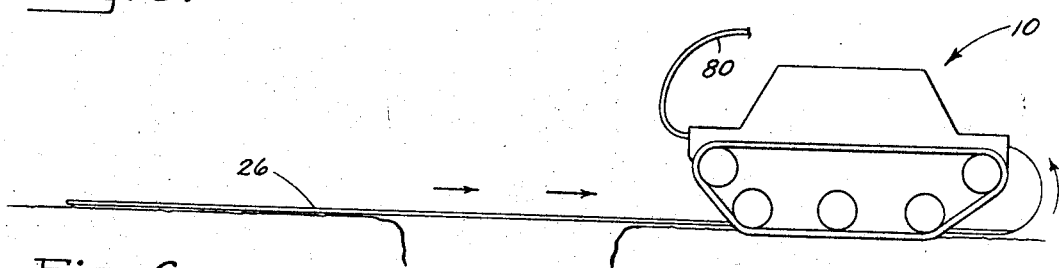

Referring to FIGS. 4, 5 and 6, to ready the vehicle for traveling over a chasm or other depression such as that shown at 82, the two support members 26 are first extended from the forward end of the vehicle so that each assumes the position indicated by the dashed outline for the support member in FIG. 4. Such extension of a support member is brought about by first detaching the support members from the rear of the vehicle by releasing anchoring hooks 30, and then energizing motor 44 whereby rollers 36 are caused to rotate in a counterclockwise direction in FIG. 2. This results in unwinding of the support members from their drums and the formation of an extended closed loop of the two support members in front of the vehicle. When sufficient lengths of the support members have been extended to completely bridge the chasm, as indicated in FIG. 4, motor 44 is deenergized and motor 14 energized, to produce forward travel of the vehicle through its tracks (and rotation of rollers 18, 22 and also rollers 62, 64 in a clockwise direction in FIG. 2). The tracks then cause the vehicle to travel outwardly over the chasm while supported on the two support members 26. With the vehicle only supported on the support members as shown in FIG. 5, forward progress is produced by the rotation of rollers 62, 64 which now by gravity are forced against the upper surfaces of the lower reaches of the support members. On reaching level ground again as in FIG. 6, the tracks again engage the ground to lift the vehicle and produce further forward travel.

On crossing the chasm and the vehicle reaching the position shown in FIG. 6, motor 44 may be energized to feed expanses of the support members onto the drums with the drums then coiling up these expanses by winding them about their perimeters. With coiling of the support members on the drums, the ends mounting eyes 34 are retracted toward the vehicle to a position adjacent the anchoring hooks. These ends then may be secured in place utilizing the anchoring hooks as earlier discussed.

It should be obvious from the above that a unique form of bridging apparatus is contemplated, which, when not in use, is mounted on the vehicle in a relatively compact state. The bridging mechanism may be extended when it is desired to bridge a chasm of considerable width, with the mechanism when so extended readily supporting the vehicle for movement across such chasm. As a toy, and especially when equipped with a remote control unit as discussed, the vehicle proves extremely fascinating to youngsters by reason of the various types of movements produceable therein.

It is claimed and desired to secure by Letters Patent:

1. In combination with a toy vehicle, a depression traversing support mounted on the vehicle, said support comprising an elongated member extensible longitudinally from one end of the vehicle, said member having an arcuate transverse cross section when extended and said cross section imparting rigidity to the support whereby said vehicle is supportable for movement on said support, said arcuate transverse cross section being flattenable and said member, when its cross section is so flattened, having sufficient flexibility to enable coiling of the same, and stowage means in said vehicle for receiving said member when the same is retracted with said member coiled.

2. The combination of claim 1 which further comprises power-operated means on the vehicle for extending and retracting the support.

3. The combination of claim 1, wherein said stowage means in the vehicle includes a drum which said support is coiled upon when in its flattened state.

4. The combination of a toy vehicle frame and ground-traveling means mounted on the frame supporting it for movement over the ground,
   at least one elongated support mounted on the vehicle frame for longitudinal extension outwardly from one end of the frame, operable to form a vehicle-supporting bridge when extended from the vehicle,
   power-operated means on the vehicle for extending said support whereby said bridge is formed, and
   power-driven means on the vehicle engageable with the support when the support is extended operable through engagement with said support to move the vehicle on the support when said ground-traveling means are out of ground contact.

5. The toy vehicle of claim 4, wherein said ground-traveling means includes structures positioned on laterally opposite sides of the vehicle frame, and said support is extensible from one end of the vehicle in a region located between said laterally spaced structures, and said power-operated means for engaging said support is located beneath the vehicle intermediate the laterally spaced structures.

6. Depression-traversing apparatus for a toy vehicle including a vehicle frame and ground-traveling means supporting said frame for movement over the ground comprising
   an elongated support having one extremity detachably anchored to the vehicle's frame adjacent one of the latter's ends,
   said support including a lower reach extending from said one extremity under the vehicle and thence outwardly from the opposite end of the vehicle, a reverse bend extending upwardly from said lower reach, and an upper reach extending into the vehicle at its said opposite end, and power-driven means mounted on the vehicle engageable with said lower reach of said support, said power-driven means producing movement of the vehicle on said support upon detachment of said one end of the support from said vehicle frame.

7. The apparatus of claim 6, wherein said toy vehicle includes means containing in coiled form the extremity of said support opposite the support's said one extremity.

References Cited

UNITED STATES PATENTS 1,828,288   2/1930   Marx _____ 46—219

FOREIGN PATENTS 252,815   10/1912   Germany.
675,507   5/1939   Germany.

LOUIS G. MANCENE, *Primary Examiner.*

CHARLES R. WENTZEL, *Assistant Examiner.*

U.S. Cl. X.R.

46—219; 180—9.32